Oct. 6, 1925.
H. C. SHORT
SHIPPING CAGE FOR BEES
Filed Dec. 30, 1924 2 Sheets-Sheet 1
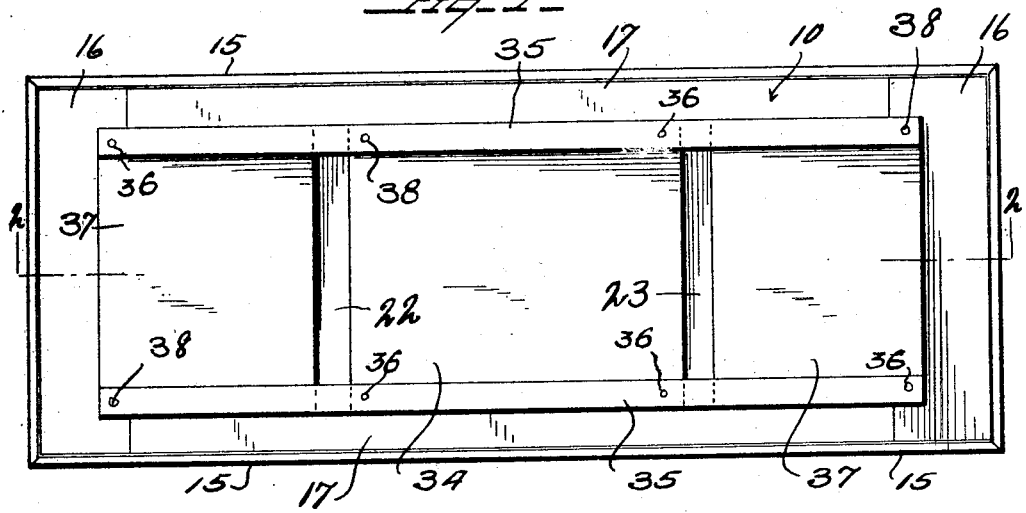
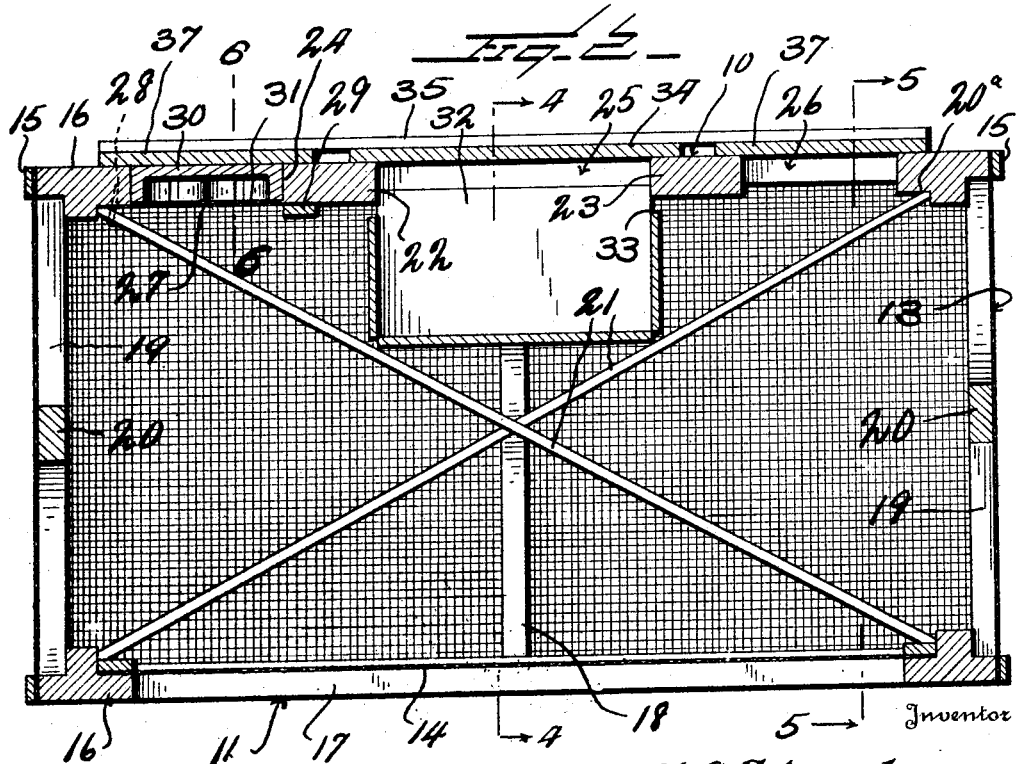
Inventor
H. C. Short
By Watson E. Coleman
Attorney

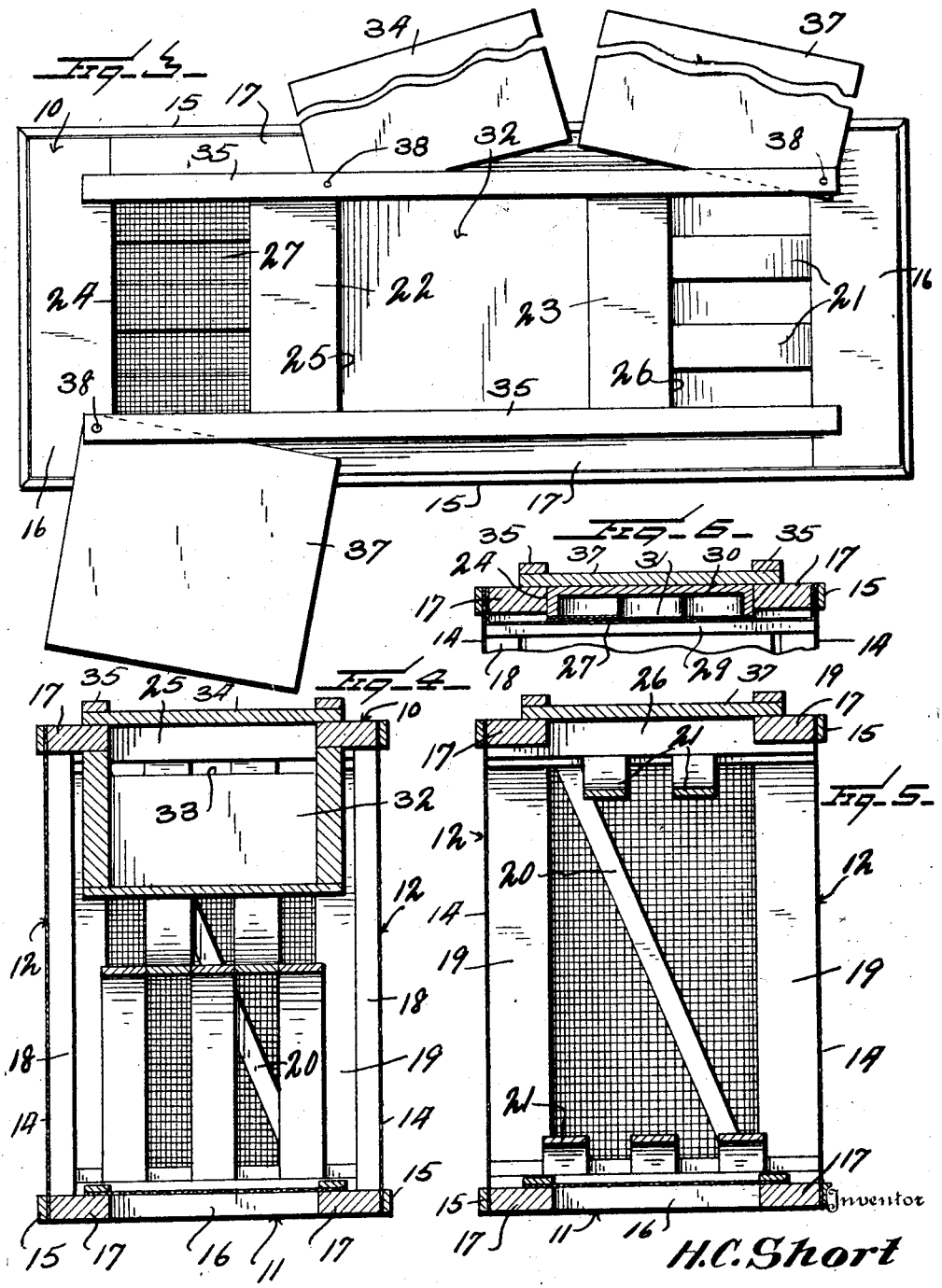

Patented Oct. 6, 1925.

1,556,254

UNITED STATES PATENT OFFICE.

HERMAN C. SHORT, OF FITZPATRICK, ALABAMA.

SHIPPING CAGE FOR BEES.

Application filed December 30, 1924. Serial No. 758,866.

*To all whom it may concern:*

Be it known that I, HERMAN C. SHORT, a citizen of the United States, residing at Fitzpatrick, in the county of Bullock and State of Alabama, have invented certain new and useful Improvements in Shipping Cages for Bees, of which the following is a specification, reference being had to the accompanying drawings.

This invention relates to a shipping cage for bees and more particularly to a device of this character so constructed that the handling of the bees and more particularly the handling of the queen bee is facilitated.

An important object of the invention is to provide a device of this character having a separate compartment in which the queen bee may be placed in the usual shipping cage, which compartment is accessible after the hive has been filled with bees for either insertion or removal of the queen bee cage. As is well known to those familiar with the art in large bee breeding establishments it is the custom to breed the queen at a different point. With cages of the ordinary construction it is necessary to first insert the queen bee and then remove the cage to the point where it is to be filled with the workers. The queen bee, depending as she does, upon the workers for food and protecting warmth, is, during the period between the time she is placed in the cage and the time the workers are placed in the cage, subjected to exposure often affecting her health and resulting in her death before the shipment has arrived at its destination. Furthermore, where the queen bee is in a common compartment with the remaining bees, it is impossible to open this compartment to remove the queen bee without the escape of certain of the workers and these workers escaping in a strange territory become demoralized and are lost. This is avoided where the queen bee may be first removed and placed in a hive provided for the reception of the remaining bees as they readily follow the queen and their transfer from the shipping cage to the hive is rendered an easy matter and may be accomplished indoors. This is extremely important when it is considered that shipments of the bees from the South to the North usually arrive at the North early in April and May when outdoor conditions are such that handling of the bees would be either unpleasant or impossible.

A further object of the invention is the provision of a cage of such structure that proper ventilation of the cage is assured, this being an important feature due to the fact that where bees do not receive full ventilation their cluster temperature increases rapidly and they soon die.

A further object of the invention is to provide a device of this character which while formed with the use of but little material is very strongly braced and rigid in its structure and which has certain of its braces so arranged that in addition to bracing the cage they form a support for the cluster saving the strength of the bees and enabling shipment thereof for greater distances.

A still further object of the invention is to provide a device of this character having at least one solid wall when in shipping condition so that the bees will be protected, during shipment and particularly at those times when they are piled at express offices or junction points, against the action of the sun or rain, exposure to either of which often results fatally.

These and other objects I attain by the construction shown in the accompanying drawings, wherein for the purpose of illustration is shown a preferred embodiment of my invention and wherein:—

Figure 1 is a plan view of a bee shipping cage constructed in accordance with my invention in condition for shipping;

Figure 2 is a vertical longitudinal sectional view therethrough taken on the line 2—2 of Figure 1;

Figure 3 is a plan view of the cage with the covers swung to open position showing the manner in which the food, bees and queen bee cage are placed in position in the shipping cage;

Figure 4 is a section on the line 4—4 of Figure 2;

Figure 5 is a section on the line 5—5 of Figure 2; and

Figure 6 is a detailed sectional view on the line 6—6 of Figure 2 showing how the queen bee cage is placed in communication with the interior of the shipping cage after the cage has been filled.

Referring now more particularly to the drawings, the cage comprises a skeletonic frame affording a top 10, bottom 11 and side and end walls 12 and 13. The side and end walls 12 and 13 are covered with screen mesh 14 and held in position by means of narrow strips 15, the mesh of the bottom section being secured to the upper surface of the bottom section so that when the cage is seated upright it is held in spaced relation to the surface of the next adjacent cage or the ground as the case may be to provide ventilating space in the first instance and in the second instance to provide against its contact with a possibly damp or musty surface.

The top and bottom 10 and 11 each include end members 16 connected by longitudinally extending side members 17. The side members 17 of the top and bottom members are connected intermediate their ends by vertically extending braces 18 stiffening the center of the cage. The end members 16 of the top and bottom sections are connected at their ends by vertically extending corner posts 19 about which the wire providing the side wall is passed. Between the upper end of each corner post 19 and the lower end of the associated corner post at each end of the device, a diagonally extending brace 20 is disposed. Each end member 16 is rabbeted upon its inner face as indicated at 20$^a$ to provide a transversely extending shoulder against which engage the ends of diagonal braces 21, these braces connecting the upper end member at one end of the cage with the lower end member at the opposite end of the cage and being arranged alternately so that they cross at the center and combine to form an efficient cluster support as well as brace the cage.

The top 10 has its side members 17 connected at spaced intervals by transverse bars 22 and 23 forming in the top of the cage three separate openings 24, 25 and 26, one of these openings at present shown as the opening 24 is closed at the under side of the top by screen mesh 27, the ends of which are bent upwardly about the sides of the side members 17 and held in position by the strips 15 securing the wire mesh 14 thereto and the sides of which are held in position by the securing elements 28 of the braces 21 and a small strip 29, these edges engaging the end member 16 and cross member 22 respectively. This opening is adapted to receive the queen bee compartment 30, this compartment having one side thereof closed only by a screen 31 and this side of the compartment being placed downwardly so that communication may be had between the interior of the cage and the interior of the queen bee cage through these two layers of wire mesh. The queen bee cage should fairly closely fit within the opening 24 so as to prevent excessive movement which would frighten the bees within the cage and tend to cause them to neglect their proper duties. This queen bee cage may be of any suitable construction but when placed within the opening 24 should have its upper surface flush with the upper surface of the top for a purpose presently to appear. Beneath the second opening, a food compartment 32 is formed. This compartment may be of the usual construction having openings 33 permitting access thereto from the interior of the cage. This opening is at present disclosed as the opening 25 while opening 26 is employed for the insertion of the worker bees.

In preparing the case for shipment, the food is first placed in the food compartment and the cover 34 applied to this compartment. This cover is held in position by longitudinally extending strips 35 secured to the top by securing elements 36 extending through the strips, the cover 34 and the top structure. The ends of these strips extend along the sides of the openings 24, 26 and covers 37 for these openings are provided and at this time are held in position by a single securing element 38 serving as a pivot. The cage is then delivered to the out-yards where the worker bees are inserted after which a second securing element is inserted through the cover 37 of the opening 26. The cage thus sealed is delivered to the queen bee nursery where a queen bee cage is inserted immediately before shipment of the cage and the cover 37 of the opening 24 swung into position and secured. These covers will be properly marked and when the shipment is received, the purchaser acting under instructions will readily first remove the queen bee cage and seeing that she is all right will place this cage in his hive in a suitable position, after which, in a space left within the hive, he will insert the bee shipping cage, remove the covers 34 and 37 and immediately close the hive. The bees without further attention will leave the shipping cage and cluster around their queen and will eat out the candy plug of the queen bee cage and thereby release the queen. In a few days, after the bees have become familiar with their new home, the cages may be removed from the hive. During shipment, regardless of how the cages may be piled, proper ventilation is secured and an adequate support for the cluster maintained.

Since obviously many changes are possible in the structure hereinbefore set forth, I do not limit myself to such specific structure except as hereinafter claimed.

I claim:—

1. A bee shipping cage having an opening through which the workers may be inserted and a second opening having its inner end screened from the remainder of the cage and adapted for the reception of a queen bee cage, said queen bee cage having a screen wall contacting the screen separating the opening from the remainder of the cage and separate closures for each of said openings.

2. A bee shipping cage have an opening through which the workers may be inserted and a second opening having its inner end screened from the remainder of the cage and adapted for the reception of a queen bee cage, said queen bee cage having a screen wall contacting the screen separating the opening from the remainder of the cage and separate closures for each of said openings, said queen bee cage closely fitting the opening for its reception.

3. A bee shipping cage having a top provided with three openings, a food compartment arranged beneath one of said openings, the second opening having its inner end screened from the remainder of the cage, the third opening communicating with the interior of the cage and separate closures for each of said openings.

4. A bee shipping cage having a top provided with three openings, a food compartment arranged beneath one of said openings, the second opening having its inner end screened from the remainder of the cage, the third opening communicating with the interior of the cage and separate closures for each of said openings, the second named opening being adapted for the reception of a queen bee cage and being of a size closely fitting the cage to be inserted therein.

5. A bee shipping cage having a top provided with three openings, a food compartment arranged beneath one of said openings, the second opening having its inner end screened from the remainder of the cage, the third opening communicating with the interior of the cage and separate closures for each of said openings, all of said openings being aligned, a pair of strips having securing elements therefor engaged through the cover of the first named opening and in the top of the cage to maintain such cover in position, said strips extending at the sides of the second and third openings, the covers for said second and third openings being secured to the cage top by a single securing element directed through one of said strips and forming a pivot about which said covers may be rotated to uncover the openings with which they are associated.

6. A bee shipping cage comprising a skeletonic frame including top, bottom, side and end walls, said bottom, side and end walls being covered with screen mesh, the framework of the top providing a plurality of openings therein, one of which is screened from the remainder of the cage, said top having closures combining with the framework of the top to exclude light and moisture.

7. A bee shipping cage including a skeletonic frame having top, bottom, side and end walls, said bottom, side and end walls being covered with screen mesh, said top and bottom each including end members and a plurality of transversely spaced diagonal braces each having their lower ends secured to the end members of the bottom and their upper ends secured to the end members of the top at the opposite ends of the cage.

8. A bee shipping cage including a skeletonic frame having top, bottom, side and end walls, said bottom, side and end walls being covered with screen mesh, said top and bottom each including end members and a plurality of transversely spaced diagonal braces each having their lower ends secured to the end members of the bottom and their upper ends secured to the end members of the top at the opposite ends of the cage, alternate braces having their lower ends secured to end members of the bottom at opposite ends of the cage whereby said braces cross centrally of the cage and combine to provide a centrally disposed cluster support.

In testimony whereof I hereunto affix my signature.

HERMAN C. SHORT.